Sept. 6, 1960  E. BARTHOLOME ET AL  2,951,749
REACTION OF GASEOUS HYDROCARBONS WITH OXYGEN
Filed June 22, 1955
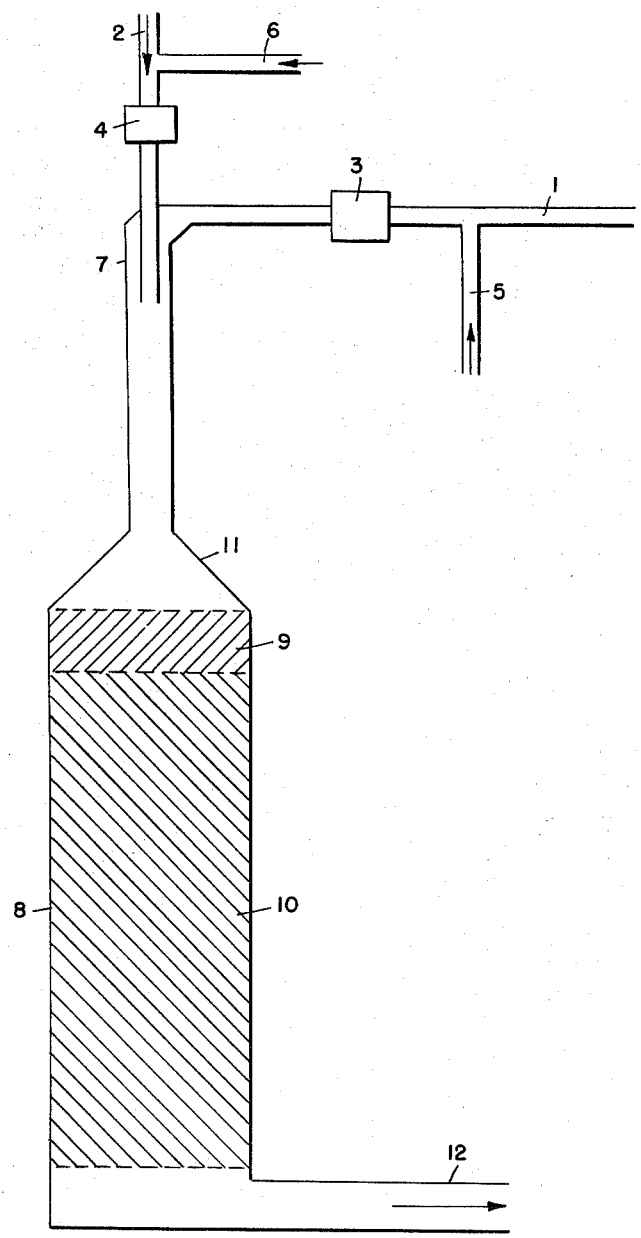
INVENTORS:
ERNST BARTHOLME
HELMUT NONNENMACHER
OTTO FREY
BY Marshall, Johnston, Cook & Root
ATT'YS

2,951,749

REACTION OF GASEOUS HYDROCARBONS WITH OXYGEN

Ernst Bartholome, Helmut Nonnenmacher, and Otto Frey, Ludwigshafen (Rhine), Germany, assignors to Badische Anilin- & Soda-Fabrik Aktiengesellschaft, Ludwigshafen (Rhine), Germany Filed June 22, 1955, Ser. No. 517,296

Claims priority, application Germany June 22, 1954

5 Claims. (Cl. 48—196)

This invention relates to the manufacture of carbon monoxide and hydrogen by the interaction of gaseous hydrocarbons and oxygen without flame formation.

It is already known to react gaseous hydrocarbons with amounts of oxygen insufficient for complete combustion, if desired with admixture of steam, at catalysts, in particular at nickel catalysts, to form synthesis gases without the formation of a flame. For example if the initial material is methane, the reaction proceeds according to the equation:

(I)    $CH_4 + \frac{1}{2}O_2 = CO + 2H_2 + 7.4$ kcal.

It has now been found that the reaction I does not proceed in one stage, but that first only a part of the methane reacts according to Equation II in a strongly exothermic reaction:

(II)    $\frac{1}{4}CH_4 + \frac{1}{2}O_2 = \frac{1}{4}CO_2 + \frac{1}{2}H_2O + 48$ kcal.

while the remainder reacts according to the equations:

(III)    $CH_4 + CO_2 = 2CO + 2H_2 - 62$ kcal.
(IV)    $CH_4 + H_2O = CO + 3H_2 - 54$ kcal.

The consequence of this stagewise process is that very high peak temperatures occur in the first part of the catalyst layer. In particular in the catalytic reaction of hydrocarbon-containing gases which are contaminated with small amounts of sulphur compounds, as for example coke oven gases, with oxygen, peak temperatures of more than 1100° C. are obtained even after flowing through a few centimetres of the catalyst because the sulphur compounds inhibit the endothermic reactions III and IV to a greater extent than the exothermic reaction II. In carrying out the reaction on a technical scale, these peak temperatures constitute a serious danger because even with moderate preheating of the reactant gases a flame which causes the formation of soot is suddenly formed and can strike back to the point of mixing of the reactant gases.

Attempts have already been made to make a stationary flame impossible by mixing the reaction gases in a mixing zone at very high speed and filling the whole reaction chamber up to the point of entry of the reaction gas mixture with catalyst. This arrangement has the drawback, however, that a high pressure drop must be tolerated and a safe operation is possible only within relatively narrow limits of the gas feed rate. A reduction of the pressure drop, even if not entirely satisfactory, is obtained by filling with inert material the space between the mixing apparatus and the catalyst layer. It has been found, however, that in technical operation the inert material gradually becomes contaminated with iron and iron oxide dust originating from the preheaters, and thereby becomes catalytically active in respect of reaction II so that a strongly exothermic reaction with peak temperatures of 1400° C. and more starts in the interposed inert layer with a sharp increase in pressure. Other proposals, such as subdivision of the catalyst layer into a plurality of layers arranged one behind another and corresponding subdivision of the oxygen-containing gas, or catalytic conversion of only part of the hydrocarbons at relatively low reaction temperature and subsequent combustion of the remaining part, have led to processes which are too complicated and troublesome to operate.

We have now found that the said difficulties in the reacting of hydrocarbons or hydrocarbons containing gases with oxygen insufficient for complete combustion of the hydrocarbons to form carbon monoxide and hydrogen can be obviated in a simple and economical manner by bringing together the gases to be reacted, passing the joint gases through a void space, reducing therein their speed of flow markedly, then passing the gases through a layer of granular refractory material catalytically inert toward the reaction of hydrocarbons with oxygen, and then immediately through a catalyst capable of activating the reaction of hydrocarbons with oxygen, arranged in a fixed bed.

The speed of the gases brought together is reduced in the said empty space preferably to less than about half and advantageously to less than one fifth of the speed of the gases at the entrance into the empty space. If the gases are brought together in a plurality of mixing apparatus, the gas speed means the average value of the speed of the gases brought together in these mixing apparatus which results having regard to the individual partial amounts.

In the layer of refractory material a sharp increase of temperature must be prevented. This can be done by refining the joint gases before the entrance into the layer from iron impurities originating from the apparatus, or by using a layer of refractory material so thin that the residence time of the gases is so small that a surface combustion after the charging of the material with iron impurities originating from the apparatus cannot fully develop and the temperature does not rise sharply in the layer of refractory material. The iron impurities originating from the apparatus may be removed from the gases by conventional means such as a magnetized, steel wool type filter placed in the gas supply lines 1 and 2, preferably after the preheaters 3 and 4 or in the mixing apparatus 7. Preferably the temperature gradient in the layer of refractory material should be less than 30° C. to one centimeter at any point in the direction of the gas flow. It is surprising that such thin layers should be capable of safely preventing the formation of a stationary flame.

In the reaction of coke oven gas with oxygen and steam to form synthesis gas on a technical scale, the gases being introduced into the furnace in premixed condition, it has been found that by the use of an inert refractory material of a grain size of about 10 to 20 millimetres, a layer thickness of about 6 to 20 centimetres prevents any undesirable pre-ignition of the gas mixture.

It has been found to be preferable to arrange the piled layer of inert material above the catalyst layer which is resting on an arched grate and to allow the gas mixture to be reacted to pass downwardly through the layers. An advantageous embodiment of this arrangement consists in forming the upper part of the otherwise cylindrical reaction vessel in the form of a cone which gradually opens toward the layer of refractory material.

The process can be carried out at atmospheric or increased pressure, as for example at 1 to 30 excess atmosphoeres. Oxygen-containing gases, as for example air, can be used instead of oxygen. The amount of oxygen corresponds substantially to the stoichiometrical amount necessary according to Equation I or somewhat more, as for example 10% more. The addition of steam is advantageous as a rule. As catalysts we use the catalysts well known for the reaction of hydrocarbons with oxygen and if desired steam in order to form carbon monoxide and hydrogen, f.i. a nickel catalyst on magnesite.

One embodiment of the process will now be described by way of example with reference to the accompanying diagrammatic drawing.

250 normal cubic metres per hour of coke oven gas with a methane content of about 30% are led through a pipe 1 and 46 normal cubic metres per hour of oxygen through a pipe 2 and supplied to preheaters 3 and 4 and therein heated, together with a total amount of 60 kilograms of steam per hour, flowing in through pipes 5 and 6, to 600° C.; the whole is well mixed in a mixing apparatus 7 and then led over a catalyst prepared by soaking magnesite with aqueous nickel nitrate solution and then decomposing the nitrate and containing about 3% of nickel, at a pressure of about 1 atmosphere and thereby reacted to synthesis gas. The reaction vessel consists of a lower cylindrical part 8 of a length of about 1½ metres in which granular magnesite 9 is arranged in a layer about 15 centimetres thick on a catalyst layer 10 of 1 metre thickness, and an upper part 11 which tapers conically upwards and to which is attached the mixing apparatus 7 for the gases to be reacted. The gas mixture flows through the reaction chamber downwardly; the synthesis gas formed leaves the reaction vessel through a pipe 12. The speed of the mixture of coke oven gas and oxygen is reduced to less than about one tenth as it flows through the free conical part of the reaction vessel. The reaction temperature at the end of the catalyst layer amounts to about 950° C.

About 400 normal cubic metres per hour of synthesis gas are obtained having the following composition:

| | Percent by volume |
|---|---|
| $CO_2$ | 4.4 |
| CO | 20.9 |
| $H_2$ | 68.2 |
| $CH_4$ | 0.2 |
| $N_2$ | 6.3 |

The plant operates continuously free from preliminary reactions and ignitions.

Then working under otherwise identical conditions without the layer of magnesite over the catalyst, and when the gases to be reacted are preheated to more than about 300° C., pre-ignition occurs in the free space in front of the catalyst layer, which results in the formation of soot, plugging use catalyst layer even after a short time of operation.

If a magnesite layer of 50 centimetres thickness is arranged in front of the catalyst layer, then with a preheating temperature of the gases to be reacted of about 450° C. or more, preliminary reactions take place in the magnesite layer after a certain time which lead to the surface combustion of the gases at the magnesite with a peak temperature of 1400° C. The reaction migrates to the entrance and initiates a pre-ignition in the free space in front of the magnesite layer.

What we claim is:

1. A process for the production of a synthesis gas containing carbon monoxide, hydrogen, carbon dioxide and not more than .2% methane without flame formation which comprises mixing in a mixing zone void of solids a preheated hydrocarbon gas and an amount of $O_2$ containing gas insufficient for complete combustion of the hydrocarbon gas at a rate of flow sufficient to avoid flame formation in the mixing zone; adding steam to at least one of said gases prior to mixing thereof; passing the mixed gases downwardly through a space void of solids having the shape of an upstanding cone and therein reducing the speed of flow of the mixed gases to less than one-half the speed of the mixed gases at the entrance to said space without the formation of a flame in said space; then passing the mixed gases through a layer of a granular refractory material adjoining said space, said refractory material having a grain size of 10 to 20 millimeters and being catalytically inert toward the reaction of hydrocarbon gases and oxygen, said layer having a thickness between about 6 and 20 centimeters; and then immediately contacting the gases with a nickel-on-magnesite catalyst in a fixed bed.

2. A process for producing a synthesis gas containing carbon monoxide, carbon dioxide, hydrogen and not more than 0.2% methane which comprises mixing in a mixing zone void of solids a preheated hydrocarbon gas and an amount of a preheated $O_2$-containing gas insufficient for complete combustion of said hydrocarbon gas at a rate of flow high enough to avoid flame formation in said mixing zone; passing the mixed gases through an enlarged zone void of solids without flame formation in said enlarged zone and therein reducing the flow velocity of said mixed gases to a velocity less than one-half the velocity of said gases at the entrance of said enlarged zone; then passing the mixed gases from said enlarged zone into and through a layer adjoining said enlarged void zone and about 6–20 centimeters in depth, said layer being made up of a granular, refractory material catalytically inert toward a hydrocarbon-oxygen reaction and having a grain size of about 10–20 millimeters; and immediately thereafter contacting said mixed gases with a fixed bed combustion catalyst.

3. The process of claim 2 wherein the velocity of the gases in the enlarged zone is reduced to less than one-fifth of the speed of the gases upon their entrance into said enlarged zone.

4. The process of claim 2 wherein the enlarged zone has the shape of a cone which opens toward the layer of granular, refractory material.

5. The process of claim 2 wherein the amount of oxygen mixed with the hydrocarbon gas is, on a molar basis, equal to at least the stoichiometric amount necessary to convert the hydrocarbon constituents of the hydrocarbon gas all to $CO + H_2$.

References Cited in the file of this patent

UNITED STATES PATENTS

| 1,830,826 | Cox | Nov. 10, 1931 |
| 2,039,603 | Maier | May 6, 1936 |
| 2,524,840 | Shapleigh | Oct. 10, 1950 |
| 2,605,174 | Krejci | July 29, 1952 |
| 2,655,442 | Mayland | Oct. 13, 1953 |

FOREIGN PATENTS

| 655,869 | Great Britain | Aug. 1, 1951 |

OTHER REFERENCES

Ellis: "Flameless Combustion," 1912, pages 28, 29, 30, 31.